Oct. 30, 1962
C. H. BRUMLEY
3,060,805
IMAGE FORMING ELEMENT
Filed May 4, 1959
2 Sheets-Sheet 1
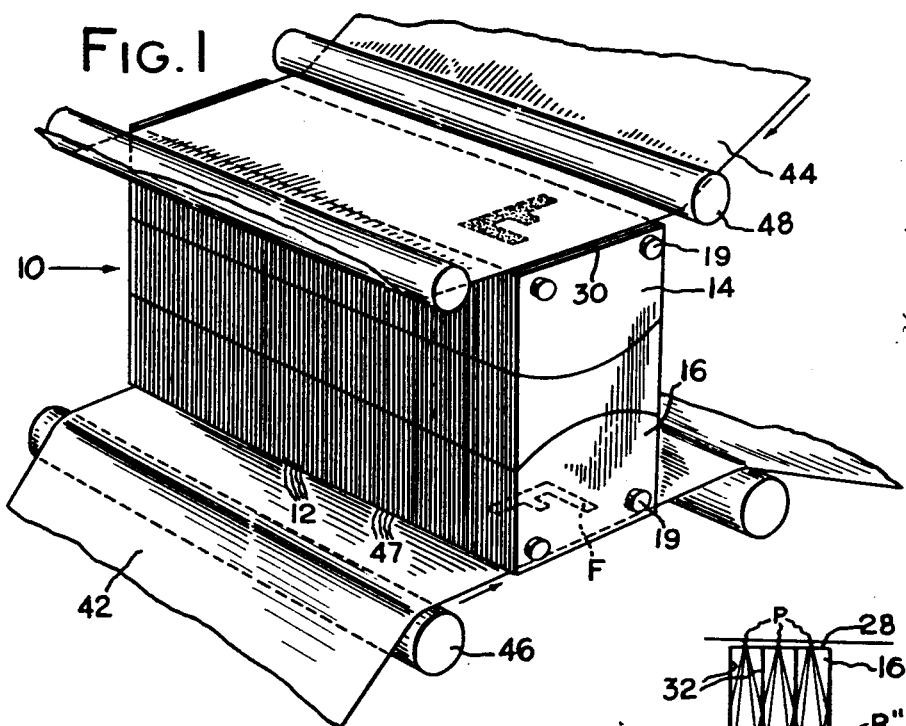
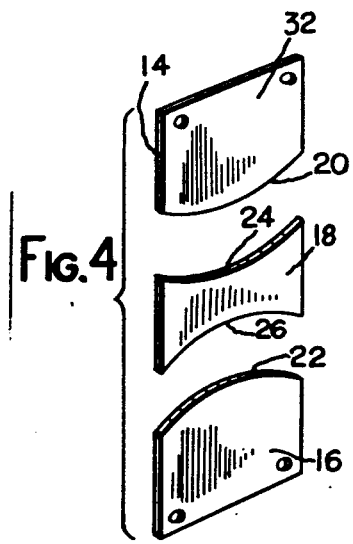
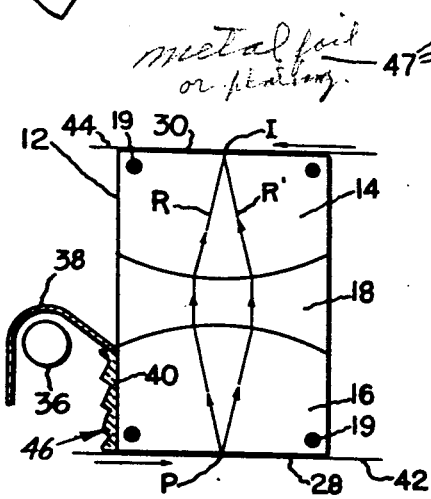
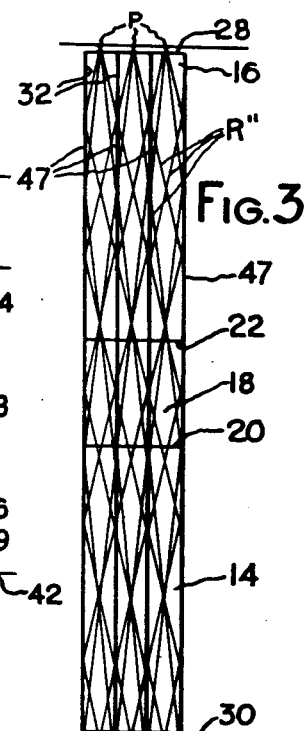
INVENTOR.
CORWIN H. BRUMLEY
BY Frank C. Parker
B. A. Chiama
ATTORNEYS Oct. 30, 1962 C. H. BRUMLEY 3,060,805
IMAGE FORMING ELEMENT
Filed May 4, 1959 2 Sheets-Sheet 2
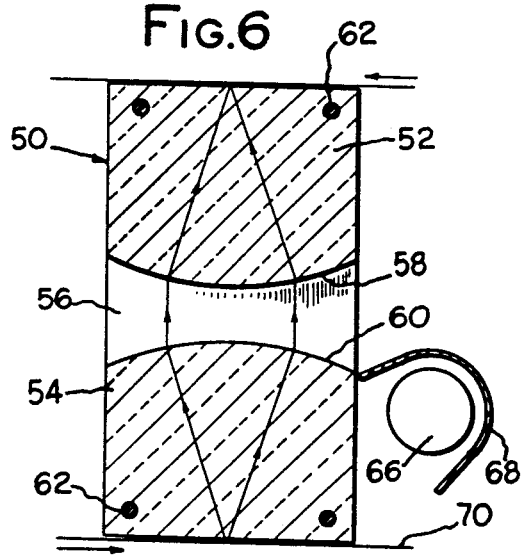
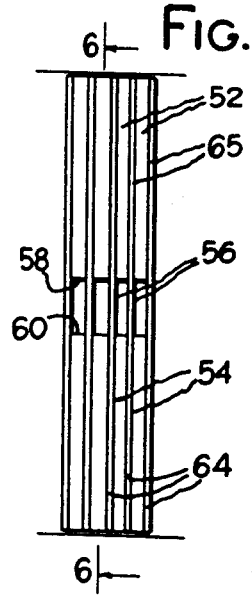
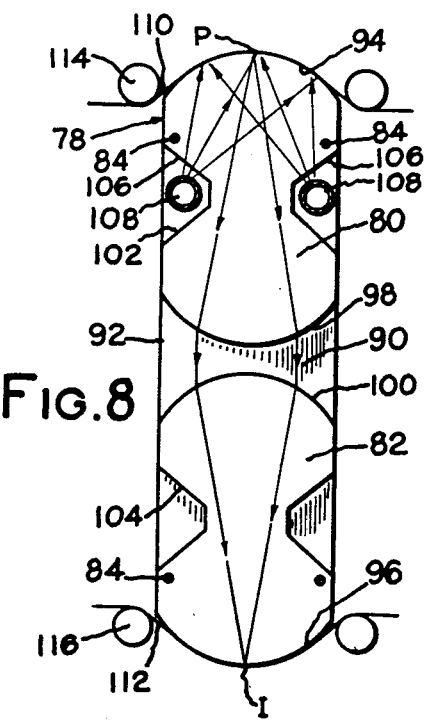
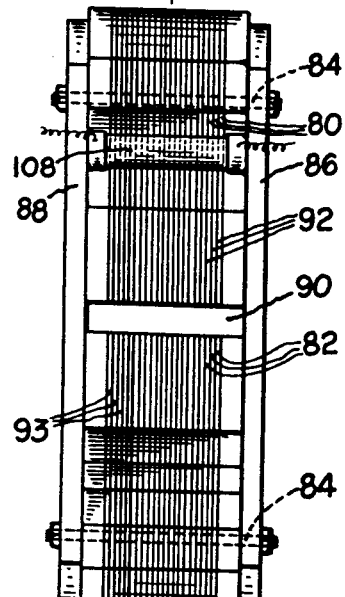
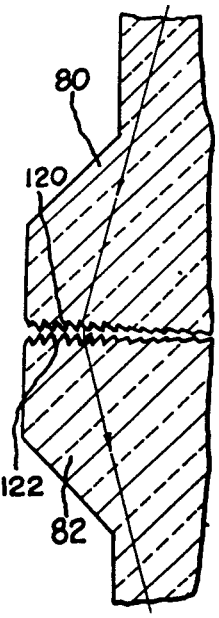
INVENTOR.
CORWIN H. BRUMLEY
BY Frank C. Parker
B. A. Chisma
ATTORNEYS

United States Patent Office 3,060,805
Patented Oct. 30, 1962

3,060,805
IMAGE FORMING ELEMENT
Corwin H. Brumley, Penfield, N.Y., assignor to Bausch & Lomb Incorporated, a corporation of New York
Filed May 4, 1959, Ser. No. 810,745
5 Claims. (Cl. 88—57)

The present invention relates to optical image forming devices and more particularly to optical means for forming an image of an object such as a sheet of copy and transmitting the image to a surface such as a light sensitive sheet upon which the copy is to be duplicated.

The present invention is particularly adapted for copy machines wherein the material to receive the copy is sensitive to light, such a diazo material, and the material to be copied is imprinted upon material which is opaque to light or sensitized to transmission printing. In the diazo reaction or blueprinting processes, the transferring of an image is direct, that is, the sensitive surface is held in contact with the master and a light is positioned behind the master so that light rays pass through the master. For good results, the original text to be copied must be a contrasty black on white and the master paper must be reasonably translucent. If the text is on opaque paper or other material impervious to light or if translucent but printed on both sides, the diazo reaction or blueprinting processes cannot be utilized. Therefore, it is the principal object of the present invention to provide an image forming device which will permit the transferring of an image from a text having an opaque backing to photosensitive paper.

Another object of the invention is to transfer images from one surface to another surface while maintaining high resolution and efficient light transfer.

Other objects and advantages will become apparent to those skilled in the art from the following specification taken in conjunction with the accompanying drawings wherein:

FIG. 1 is a perspective view of the image forming device of the present invention shown in position of operation;

FIG. 2 is an elevational view of an image forming element showing some ray traces therethrough;

FIG. 3 is an enlarged fragmentary view of some of the laminar elements of the device of FIG. 1;

FIG. 4 is an exploded view of one of the laminar elements;

FIG. 5 is a fragmentary view of a modification of a detail of the image forming device;

FIG. 6 is a sectional view of the embodiment of FIG. 5 taken along line 6—6;

FIG. 7 is an elevational view of another embodiment of the detail of the image forming device;

FIG. 8 is a sectional view of the embodiment of FIG. 7 taken along line 8—8 of that figure; and FIG. 9 is a fragmentary sectional view of a modification of a detail of the present invention.

Referring now to FIGS. 1–4 for the preferred embodiment of the invention, there is shown a stacked or laminar optical element 10 comprising a plurality of thin, transparent laminations 12 each of which consists of three parts, upper and lower segments 14, 16, respectively, and a medial segment 18. The laminations may be maintained in stacked relationship by suitable tie rods 19 projecting through openings formed in the corners of the laminations.

The segments may be made of glass or clear methyl methacrylate resin or any other suitable transparent material. The upper and lower segments are preferably exact duplicates except for their relative positioning in the element 10 and both possess the same index of refraction. Each of the segments 14, 16, is formed or bounded with a polished cylindrically curved, imaging inwardly facing edge surface 20, 22, respectively, having the same radius of curvature. The upper and lower segments of a lamination may be other than exact duplicates, that is, they may have different indices of refraction and have different radii of curvature for the edge surfaces 20, 22. In all cases, however, all of the upper segments must be exact duplicates and all of the lower segments must also be exact duplicates.

Coplanar with the upper and lower segments, the medial segment 18 is formed with two polished concave image forming edge surfaces 24, 26 of equal radii of curvature which is also equal to the curvature radii of the segments 14, 16. When assembled, the curved edge surfaces of each of the upper and lower segments of each of the laminations 12 will conform to the curved edge surfaces of the respective medial segment. Suitable optical cement may be utilized along the cooperating curved edge surfaces to maintain the segments intact thereby rendering each of the laminations a unit. The dimensions of the segments and the curvatures of the internal edge surfaces 20, 22, 24, and 26 are selected in view of the indices of refraction of the different segments 14, 16, and 18 to form a cylindrical lens having a power such that the external surfaces 28 and 30 are optically conjugate to each other.

As shown by the ray traces in FIG. 2, the lamination 12 resembles an optical lens of the triplet type but in the form of a short cylinder, rather than spherical, so that each element 12 is capable of forming an image inverted in the direction of the major plane of the element. In the plane perpendicular to the plane of the element, light is transmitted by internal reflection, without imaging or focusing. Assuming a point or elemental object P located adjacent the flat edge entry surface 28 of the lower segment 16, a pair of ray traces R and R' will indicate the path of some of the image forming light rays from the object to the elemental image I located adjacent the flat exit edge surface 30 of the upper segment 14. Image formation in this manner is accomplished entirely by the refraction as determined by the edge surfaces 20—26 and the respective indices of refraction of the segments.

Each of the laminations 12 is bounded by two plane parallel surfaces 32, 32 which are ground and polished in the case of glass laminations or, in the case of plastic, would be normally cast in the polished condition. With these surfaces being polished image forming light rays entering the entry edge surface 28 in directions other than normal thereto will be transmitted through the lamination by multiple internal reflections by the reflecting surfaces 32, 32. In FIG. 3, the light rays R" are shown as indicating typical paths of some of the light as they form the image I. It will be noted that transmission is effected by reflection of the light rays by the reflecting surfaces 32, 32. Upon emerging from the exit surface 30, the image I in each lamination will be in the form of a line, the length of which is equal approximately to the thickness of the lamination. This phenomenon will occur regardless of the shape of the elemental object P. It is important then that the thickness of the lamination be extremely small in order to permit minute dissection of the smallest elemental objects possible while at the same time reducing the length of the elemental line images. When using laminations having very small thicknesses, say on the order of 250 microns, the elemental line images will in practice appear as points similar to the elemental object which is being viewed. In practice, the resolving power for the optical element 10 is inversely proportional to the thickness of the individual lamination.

When viewing a large object, each one of the laminations transmits light from an elemental area portion of the object in line with the entry edge surface 28. The elemental area portion seen by each lamination will be in the form of a line equal in width to the width of the entry edge 28, and in length to the length of the edge 28, if the object is larger, or to the dimension of the object if that be smaller than the length of the edge. Thus, the line images emanating from the exit surfaces 30 of all of the laminations form a composite image of the object made up of adjacent visually merging line images. Each individual lamination 12 is capable of imaging only in one plane, that of the plane of the lamination, and imaging in the direction normal to the laminations is achieved by the laminar collimation of the imaging light, thereby producing a fully resolved image of the entire object to be viewed.

To illuminate the object, a light source 36 is provided along one of the sides 40 of the element 10 adjacent the lower segments 16. A shield 38 serves to confine the light only to the lower end of the element 10 so as not to, in any way, affect the image receiving medium 44 adjacent the exit surface 30. Light from the source 36 will be transmitted through the adjacent side of the element 10 and impinge upon the object medium 42 and thence be reflected upwardly in the form of image forming light rays which travel through the laminations as aforesaid. The object medium 42, which is in the form of a master sheet or roll, may in the illustrated embodiment be transparent or opaque since the image formed at the exit surface 30 consists solely of light reflected from the surface of the sheet 42 adjacent to the entrance surface 28. In order to minimize the amount of light lost by reflection by the side 40 where the illumination enters, there may be provided a glass plate having a flat surface cemented to the side 40 and a second side formed in steps 46 running lengthwise of the element 10. The steps 46 are provided with a surface generally normal to the light rays emanating from the source 36 for permitting more of these rays to enter the lower segment 16.

The laminations 12 must be optically separated from one another in order to maintain their laminar characteristics and separators 47 may serve this purpose. The separators may be formed from metallic foil such as aluminum foil, however, other substances may readily lend themselves for this purpose. Metallic coatings of aluminum and silver may be applied to each of the plane surfaces 32 by a sputtering process and thus serve as separators. Another very good arrangement for insuring adequate internal reflection is the application on each of the surfaces 32, 32 of layers of magnesium fluoride having index of refraction lower than any of the segments. Air spaces between the laminations may also be utilized for separation purposes.

In operation, a typical arrangement is shown in FIG. 1, wherein the optical element 10 is in image transferring position between a master roll or sheet of material 42 bearing the copy to be duplicated and a roll or sheet of light-sensitive material 44. The element 10 may be of any suitable length which will be determined by the number of laminations 12 utilized and the thickness of each and in general should be as long as the text to be copied is wide. For purposes of illustration, the rolls or sheets 42, 44 are shown as continually moving mediums in keeping with the usual practice of the blueprinting or diazo reaction processes. Suitable rollers 46 are arranged below the element 10 for controlling and guiding the movement of the roll 42 across the entry surface 28 of the element 10. Means, not shown, may be utilized to draw the rolls 42, 44 in the directions indicated by the arrows. Similarly, rollers 48 may be utilized for controlling and guiding the movement of the roll 44 across the exit surface 30 of the element 10. It will be noted that the movement of the rolls 42, 44 across their respective surfaces are in opposite directions. An object in the form of the letter F is shown imprinted upon the master 42 and the corresponding image of the letter is shown arranged on the sensitive material 44. It should be especially noted that the image is inverted in one dimension only, namely the dimension parallel to the major planes of the laminae 12, since it is in that direction only that imaging is accomplished by optical focusing means. In the perpendicular direction, that is, normal to the major planes of the laminae, imaging is accomplished by collimation, by dividing up the light into many relatively narrow restricted paths, with the result that no inversion takes place in the perpendicular direction.

In FIGS. 5 and 6 there is shown a modified form which the laminations may take. The laminations 50 comprise an upper segment 52 and a lower segment 54 separated by an air space segment 56. The segments 52, 54 are exact duplicates and are bounded on their inwardly facing edges by cylindrically curved edge surfaces 58, 60, respectively. The segments 52 and 54 are arranged coplanar with their curved edge surfaces adjacent one another in order to define the air space segment 56 as an air lens segment having concave curved edges. Since the index of refraction of air is unity, and assuming the indices of refraction of the segments 52, 54 are the same as the segments 14, 16, the radii of curvature of the edge surfaces 58, 60 will be greater than the edge surfaces 20, 22 for the embodiment of FIGS. 2–4.

The segments 52, 54 are held in their respective positions by suitable tie rods 62 and the laminations 50 are spaced from one another by separators which may take the form of metallic foil 64 having relatively good reflective qualities on both surfaces thereof. The transmission of image forming light rays through the segments 52, 54 is the same as the segments 14, 16, in that, the rays are reflected by the two plane polished surfaces 65 as they travel along the segment. This reflection continues by means of the separators 64 as the rays travel through the air space 56.

A suitable light source 66 and shield 68 are applied to the lower segment 54, as was the case in FIG. 2, in order to illuminate the text on the master 70. The transmission of image forming light rays is the same in the embodiment of FIG. 6 as it is in FIG. 2, that is, by reflection as the light rays bounce across the reflective surfaces of the foil 64. Imaging is acquired by refraction as the image light rays traverse the curved edge surfaces 58, 60.

In the embodiment of FIGS. 7 and 8, the image forming element is provided with laminations 78 comprising upper and lower segments 80, 82 which are held in stacked formation by a plurality of tie rods 84. Suitable end plates 86, 88 are utilized at the ends of the stacked element and are adapted to receive the rods 84 for maintaining the compactness of the element. The segments 80, 82 are exact duplicates with the lower segment being inverted relative to the upper segment. An air space segment 90 separates the two segments and serves as a positive air lens segment having an index of refraction of 1, as was the case for the embodiment of FIGS. 5 and 6. Metallic foil 92 having highly reflective surfaces is arranged between the laminations for separating the same while two plane polished surfaces 93 serve to transmit image forming light rays through the laminations. As in the embodiment of FIG. 6, the reflecting separators 92 will reflect the light rays through the air lenses 90.

As shown, the arrangement is entirely symmetrical with respect to the imaging light rays, but other arrangements may be used. For the present purposes it is only necessary that the object surface 94 and the image surface 96 be optically conjugate to each other with respect to the positive lens defined by the air segment 90.

Each of the segments has a pair of opposed cut-outs 102, 104, respectively, intermediate their ends. Suitable opaque material may be applied to the edges of the segments in these cut-outs, except the upper edges 106 of the cut-outs 102, to prevent the transmission of light therethrough. A light source 108 is suitably retained in each of the openings of the optical element 78 as defined by the cut-outs 102 and is adapted to radiate light through the edges 106 and upon the entry edge surfaces 94. With this arrangement, the cut-outs serve as diaphragms or aperture stops for the light rays transmitted through the laminations. As seen in FIG. 8, typical ray traces are illustrated, and these are extended between an elemental area of an object P on a master medium 110 and an elemental area of an image I on a copy medium 112. Suitable rollers 114 are arranged to control and guide the master 110 in a curved path across the entry edge surface 94 while other rollers 116 are arranged to control and guide the copy 112 in a curved path across the exit edge surface 96. As in the embodiments of FIGS 2 and 6, the mediums 110 and 112 are driven in opposite directions.

Restriction of the image forming light rays to paths within the respective laminations 78 is effected by the multiple internal reflection of the rays by the polished surfaces 93, and imaging in the planes of the laminations is effected by refraction within the segments. By utilizing curved entry and exit edge surfaces, field curvature is matched and this permits a relatively long portion of the master 110 to be imaged at any one time. The light sources 108 are utilized to illuminate the text to be copied on the master 110. The other edge surfaces of the segments should be coated with a suitable optically opaque material, or the entire image forming element, except for the entry and exit edge surfaces may be encased in a light-tight box. This will prevent extraneous light from entering the side edges of the segments and washing out the image light rays.

In FIG. 9, portions of each of the segments 80, 82 are shown as formed with image forming surfaces 120, 122, respectively, which are in the form of cylindrical Fresnel lenses. The Fresnel lens edge surfaces 120, 122 may be utilized instead of the continuously curved edge surfaces 98, 100, respectively, in the embodiment of FIG. 8.

The segments for the laminations 12 of the embodiment of FIGS. 2–4 and the laminations 50, 78 of the two embodiments of FIGS. 5–8 may be of various dimensions and have any suitable relative indices of refraction as long as they be optically correlated. A typical image transferring device may have the following specifications:

| | |
|---|---|
| Length (distance between the end plates 86 and 88) inches | 1.8 |
| Width (in the direction of travel of the media 94 and 96) inches | 2 |
| Height (length of the optical axis) do | 7.16 |
| Height of segment (taken along the optical axis) mm | 90.6 |
| Radius of curvature of: edge surface 94 mm | 25.4 |
| Edge surface 96 mm | 25.4 |
| Edge surface 98 mm | 30.3 |
| Edge surface 100 mm | 30.3 |
| Thickness of lamination mm | .10 |
| Thickness of the separators mm | .02 |
| Index of refraction of segments 80, 82 | 1.4893 |

From the foregoing description, it will be appreciated that the present invention provides an image forming device which does not depend upon the ability of a master copy to transmit light therethrough. The text to be copied may be picked up by reflection directly from the surface of the master and, consequently, text printed upon opaque material may be thus copied. The present invention may be utilized in many present-day copying processes such as the diazo reaction and blueprinting processes, the silver halide process and in the practice of xerography. In the event the master sheet is transparent or translucent, the light source for each of the embodiments described above may be positioned behind the master as is the practice in the above-mentioned processes. While there is in this application specifically described a preferred embodiment and two modified embodiments which the invention may assume in practice, it will be understood that these forms are shown for purposes of illustration only, and that the same may be modified and embodied in various other forms or employed in other uses without departing from their spirit or the scope of the appended claims.

I claim:

1. An optical device for producing a light image comprising a plurality of relatively thin light transmitting sheet-like elements arranged in laminar relationship, and surface means intermediate said elements for optically insulating said elements from each other, an object surface edge portion on each of said elements, an image surface edge portion spaced from said object surface edge portion on each of said elements, and separate regions of mutually different refractive indices intermediate said image portion and said object portion, the interfaces between said regions being curved to produce focusing of light rays from said object surface edge portions upon said image surface edge portion.

2. A laminar optical imaging device comprising a plurality of relatively thin light transmitting sheet-like elements assembled in laminar relationship, and means intermediate said elements for optically insulating said elements from each other, each one of said elements including two segments having similar refractive indices and a third segment having a refractive index different from the indices of said two segments, said third segment being disposed between said two segments in edgewise relationship thereto, the mutually adjacent cylindrical edge surfaces of said segments forming lenses coincident with each other for imaging a selected surface portion of one of said two segments upon a selected surface portion of the other one of said two segments.

3. A laminar optical imaging device comprising a plurality of relatively thin light transmitting sheet-like elements assembled in laminar relationship, and reflector means for optically insulating said elements from each other, each one of said elements including two segments having similar refractive indices and a third segment having a refractive index different from the indices of said two segments, said third segment being disposed between said two segments in edgewise relationship thereto, a Fresnel lens formed on the mutually adjacent edge surfaces, for imaging a selected surface portion of one of said two segments upon a selected surface portion of the other one of said two segments, said mutually adjacent edge surfaces being in the form of a Fresnel lens whereby the spacing between said two segments may be relatively uniform across the entire width of each lamina.

4. A laminar optical imaging device comprising a plurality of relatively thin light transmitting sheet-like elements assembled in laminar relationship, a reflecting adjacent surface on said element for optically insulating said elements from each other, each one of said elements including two segments having relatively high refractive indices and a third segment having a relatively low refractive index, said third segment being disposed between said two segments in edgewise relationship thereto, the mutually adjacent edge surfaces of said two segments being curved convex with respect to said third segment to form a refractive optical element having positive power for imaging a selected surface portion of one of said two segments upon a selected surface portion of the other one thereof.

5. A laminar optical imaging device comprising a plurality of relatively thin light transmitting sheet-like elements assembled in laminar relationship, reflecting adjacent surfaces on said elements for optically insulating said elements from each other, each one of said elements including two segments of a transparent solid material and a third segment composed of a gas, said third segment being disposed between said two segments in edgewise relationship thereto, the confronting edge surfaces of said two segments being convexly curved to form in conjunction with said third segment a refractive optical element having positive power for imaging a selected surface portion of one of said two segments upon a selected surface portion of the other one thereof.

References Cited in the file of this patent

UNITED STATES PATENTS

| | | |
|---|---|---|
| 942,589 | Salsbury | Dec. 7, 1909 |
| 1,687,119 | Benson et al. | Oct. 9, 1928 |
| 2,198,115 | John | Apr. 23, 1940 |
| 2,736,235 | Toulon | Feb. 28, 1956 |
| 2,867,151 | Mandler | Jan. 6, 1959 |

UNITED STATES PATENT OFFICE
CERTIFICATE OF CORRECTION

Patent No. 3,060,805                   October 30, 1962

Corwin H. Brumley

It is hereby certified that error appears in the above numbered patent requiring correction and that the said Letters Patent should read as corrected below.

Column 1, line 15, for "a" read -- as --; column 2, line 1, strike out "imaging"; column 5, line 68 was inadvertently printed upside down and should read -- surface of the master and, consequently, text printed upon --.

Signed and sealed this 23rd day of April 1963.

(SEAL)
Attest:

ERNEST W. SWIDER
Attesting Officer

DAVID L. LADD
Commissioner of Patents